Dec. 31, 1957

C. G. COLLAR 2,818,530

COOLING SYSTEMS FOR GAS FILLED
ELECTRON DISCHARGE DEVICES

Filed July 5, 1955

INVENTOR:
Charles George Collar
BY: Baldwin + Wight
ATTORNEYS

United States Patent Office 2,818,530
Patented Dec. 31, 1957

2,818,530

COOLING SYSTEMS FOR GAS FILLED ELECTRON DISCHARGE DEVICES

Charles George Collar, Chelmsford, England, assignor to Marconi's Wireless Telegraph Company Limited, London, England, a British company Application July 5, 1955, Serial No. 520,073

Claims priority, application Great Britain July 27, 1954

6 Claims. (Cl. 315—117)

This invention relates to cooling systems for grid-controlled gas filled electron discharge devices and, though not limited to its application thereto, is primarily intended for the cooling of mercury cathode electron discharge devices. The invention is, however, applicable to the cooling of other gas filled grid controlled electron discharge devices such, for example, as so-called thyratrons.

It is customary to effect forced cooling of mercury cathode and other gas filled grid controlled electron discharge devices by using a circulated cooling medium, for example by blowing air upon the device, and it is customary also to control such cooling thermostatically, for example, by switching an air blower motor on or off or by controlling the opening of a cooling air valve in dependence upon the temperature reached by some part of the device to be cooled. Such thermostatically controlled cooling, however, leaves much to be desired in the matter of reliability and speed of response, mainly because of the difficulty of obtaining adequate thermal contact between the controlling thermostat and the part of the device to whose temperature the thermostat is required to respond.

The present invention has for its object to avoid these defects.

The present invention is based upon the discovery that with mercury pool grid controlled and other grid controlled gas filled discharge tubes or switches, the grid current which flows when a discharge is set up, i. e. when the device is in effect switched on, continues for a period of time which is dependent upon the temperature of the device, the grid current flowing longer if the temperature is high than if the temperature is low. The present invention takes advantage of this discovery to provide automatic cooling control without the use of a thermostat at all and without requiring any apparatus which depends for its satisfactory functioning upon the obtaining of good thermal contact with the device to be controlled.

According to this invention a cooling system for a gas filled grid controlled electron discharge device which exhibits the phenomenon that the continuation of grid current flow after switching on is dependent on temperature comprises means, controlled in dependence on the period during which such grid current flows, for automatically controlling the cooling.

Where the device to be cooled is operated by being switched on periodically so as to produce pulses—i. e. in the case of a periodically pulsed device—the control of cooling may be effected in dependence upon the mean grid current flow, for example, by a simple relay controlling a blower motor or cooling air valve and having its operating coil included in a grid circuit of the device. Such an arrangement has the advantage of extreme simplicity but it is not very sensitive. Sensitivity may, however, be greatly improved without adding seriously to the complexity by amplifying before or after rectifying and integrating the recurrent pulses and utilising the resultant to control the cooling. In order to obtain a definite "on-and-off" control action the integrated resultant may be used to actuate a switch-over circuit when the said resultant passes a given value (which may be adjustable) said switch over circuit controlling the cooling, for example, by switching a blower motor on and off, or opening and closing a valve controlling the cooling air flow.

In another embodiment of the invention for the automatic control of the cooling of a periodically pulsed device, the pulses of grid current flowing in the grid circuit of said device are compared with synchronously produced current pulses of predetermined (and, if desired, adjustable) length and control of the cooling system effected in dependence on differences in length between the grid current pulses and the said produced pulses.

The invention is illustrated in the accompanying drawings which show various embodiments of the invention as applied to the control of the cooling of a periodically pulsed grid controlled mercury pool cathode tube or switch. Throughout the drawings like references indicate like parts.

My invention will be more clearly understood from the following specification by reference to the accompanying drawings in which.

Figure 1:
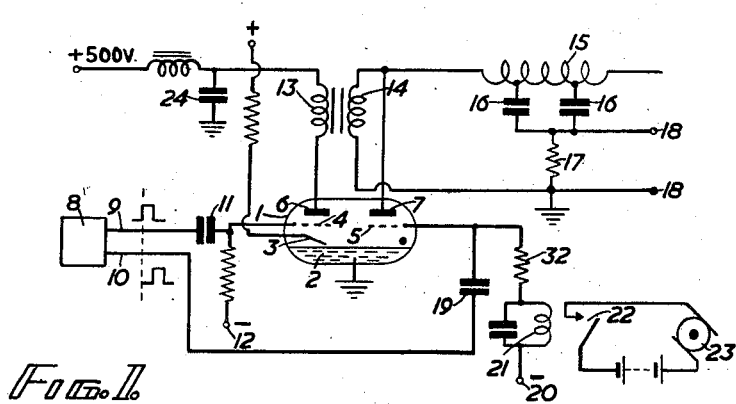
Fig. 1 shows the application of my invention to a mercury pool cathode tube.

Referring to Fig. 1 the device to be cooled is a mercury pool cathode tube 1 having the usual mercury pool cathode 2, trigger igniting electrode 3, two control grids 4 and 5, two anodes 6 and 7. A pulse generator 8 of any known form produces short recurrent pulses at a pre-determined frequency, for example, 200 pulses per second, at each of two output leads 9 and 10, the pulses in the lead 9 preceding the pulses in the lead 10 (the pulses in both leads are similar) by a short period of time as conventionally indicated, e. g. by a period of about one tenth the pulse repetition period. The pulses on lead 9 are applied through condenser 11 to control grid 4 which is negatively biased by potential applied at the terminal 12 so that the left-hand half of the tube comprising the cathode 2, the grid 4 and the anode 6 is normally non-conductive but becomes conductive when a positive pulse is applied to the grid 4. Anode potential is applied from a suitable D. C. source of, for example, 500 volts, to the anode 6 through the primary 13 of a transformer, the secondary 14 of which is connected through a delay line comprising inductance 15 and condensers 16, across a load represented by resistance 17 from which output pulses are taken at terminals 18. A condenser 24 is connected between the H. T. side of the primary 13 and earth. The "live" side of secondary 14 is connected to the anode 7 and the control grid 5 is connected through a condenser 19 to the lead 10. The control grid 5 is also negatively biased by potential applied at terminal 20, the circuit to the said terminal including a resistance 32 in series with the winding 21 of a relay having normally open contacts 22. These contacts are included in the circuit of a motor 23 driving a blower (not shown) which blows cooling air upon the tube 1.

Ignoring for a moment the relay 21, 22 and the blower motor 23, the circuit as so far described is well known and operates as follows: When a positive pulse is applied to the control grid 4 the left-hand half of the tube conducts, the igniter electrode 3 being maintained sufficiently positive as shown to ensure that this happens. When the left-hand half of the tube 1 is thus switched on it discharges the condenser 24 through the primary 13 and produces across the secondary 14 a voltage which charges the condensers 16 in the delay line relatively slowly, the charging circuit including the load circuit 17. When, a very short time later, the control grid 5 is driven positive by a pulse from the lead 10 the right-hand half of the tube is switched on and discharges the condensers 16 producing at the terminals 18 an output pulse of length dependent on the constant of the delay line. At the end of this pulse the cycle of operation is completed both halves of the tube being switched off ready for the next cycle to be initiated by the next pulse on lead 9.

It has been found that with an arrangement as so far described, when either half of the tube is switched on, grid current flows in the control grid circuit of that half and continues for a time which is dependent upon the temperature of that half of the tube, the time increasing as the temperature rises. It is believed that this is due to ionisation effect in the tube, the ionisation being dependent upon temperature so that the higher the temperature the more the number of ions collected by the appropriate grid. This effect of prolongation of grid current in dependence upon temperature is observable in the case of both grids in the illustrated arrangement, though it is proportionally more marked in the case of the control grid 5 than in the case of the control grid 4, because the curent pulse which flows through the right-hand half of the tube when that half is switched on is of shorter duration than that which flows through the left-hand half, of the tube when the latter is switched on. Accordingly with the illustrated arrangement it is preferred to effect automatic cooling control by using the current in the circuit of the grid 5 though it is possible (though not so convenient and effective) to use the current in the circuit of the grid 4. As shown the relay winding 21 is included in the grid circuit of that grid 5 and by employing that relay, when actuated, to close its contacts 22 in the blower motor circuit, the cooling of the tube 1 is made dependent upon the mean grid current flowing through the grid 5 and therefore upon the operating temperature. A condenser is shunted across the relay winding 21 to smooth its action. The said relay is so adjusted as to close its contacts when the mean grid current through the grid 5 reaches a value corresponding to the upper permissible temperature limit.

Figure 2:
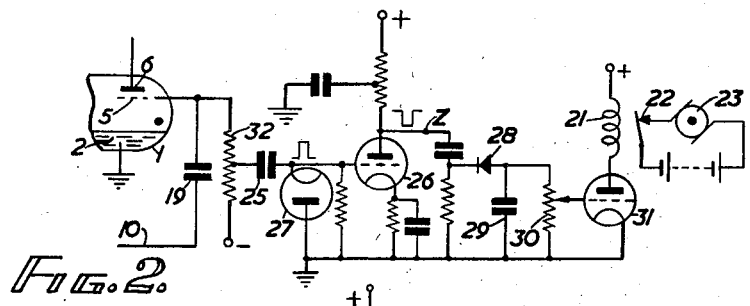
Fig. 2 shows a modified form of my invention applied to the circuit of Fig. 1.

The arrangement in Fig. 1, though very simple, is not very sensitive and to improve sensitivity the modification illustrated in Fig. 2 may be used. In Fig. 2 the whole of the circuit of Fig. 1 is not repeated but only those parts necessary to an understanding of how Fig. 2 differs from Fig. 1 are shown. Referring now to Fig. 2 the relay winding 21 is no longer directly in the circuit of the control grid 5. A tap on the grid resistance 32 is connected through a condenser 25 to the control grid of an amplifier valve 26. A diode 27 with its anode earthed has its cathode connected to the control grid of valve 26 and acts as a D. C. restorer to ensure that the pulse which appears on the control grid 26 shall be a simple positive going pulse as conventionally indicated. A negative going pulse accordingly appears at the anode of valve 26 as indicated, and this is applied through a rectifier 28 to a condenser 29 across which is a resistance 30, which is of such value that condenser 29 is sensibly discharged before the next pulse occurs: an adjustable tap on resistance 30 is taken to the control grid of a normally conductive valve 31. The relay winding 21 is in the anode circuit of this valve. The contacts 22 of this relay are included in the blower motor circuit as before but the said contacts are in this case normally closed instead of normally open.

With this arrangement it will be seen that the average negative charge in the condenser 29 will reach a value which is a function of the length of the grid current pulses from the grid 5. The tap on the resistance 30 is so adjusted and the relay 21, 22 made of such sensitivity that when the upper permissible temperature is reached the negative potential applied to the control grid of valve 31 is sufficient to cut it off. The relay contacts 22 accordingly close and the blower motor is switched on. The point Z in the circuit of Figure 2 will be referred to later.

Figure 3:
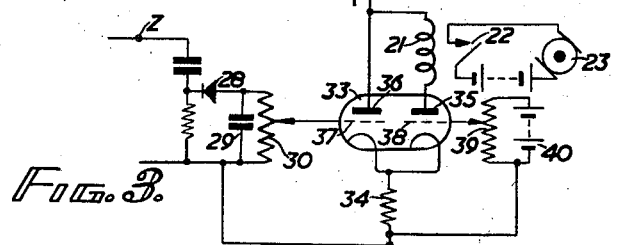
Fig. 3 shows a further modification of the circuits of Figs. 1 and 2.

Fig. 3 shows a detailed improvement upon Figure 2 and again only those parts of Fig. 3 necessary to an understanding of the change with respect to Fig. 2 are shown. The improvement consists in obtaining a sharper on and off action for control of the blower motor. Instead of the valve 31 with the relay winding 21 in its anode circuit, there is provided a double triode 33 connected with a common cathode resistance 34 and with the relay winding 21 in the circuit of the right hand anode 35, the left hand anode 36 being taken direct to H. T. The left hand control grid 37 is adjustably tapped upon the resistance 30 as in Fig. 2 and the right hand control grid 38 is adjustably tapped upon a resistance 39 across a source of potential 40 of suitable value. The contacts 22 of the relay are normally open as in Fig. 1. When the control grid 37 becomes more negative than a value determined by the setting of the tap on the resistance 39 the left hand half of the valve 33, which is normally conductive, becomes cut off, and the right hand half of the said valve 33 which is normally cut off, becomes conductive. Accordingly the relay operates and the contacts 22 close to start the blower motor. The point Z of Fig. 3 is the same as the point Z in Fig. 2, it being understood that Fig. 3 is the same as Fig. 2 except for the parts to the right of that point.

Figure 4:
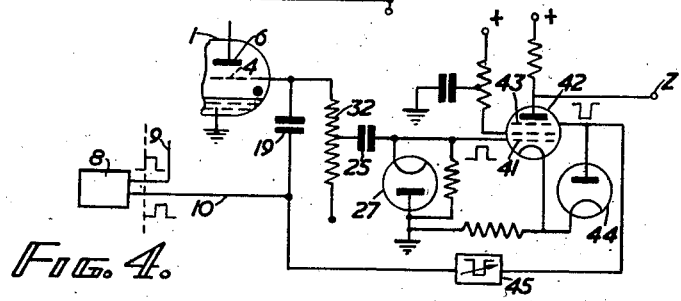
Fig. 4 shows another modified form of the circuit of my invention in which a comparison is made between locally generated pulses of predetermined, and if desired, variable length with pulses produced in the tube circuit to which the system of my invention is applied.

Fig. 4 shows a further modification in which the current pulses produced in the circuit of the control grid 4 are compared with locally generated pulses of predetermined and, if desired, variable length. In this diagram, in which again only such parts are shown as are necessary to an understanding of the arrangement, positive pulses from a tap on the resistance 32, D. C. restored by a diode 27 as in Fig. 2, are applied to the first grid 41 of a pentode 42, whose second grid is positively biased as in the usual way. Negative going pulses which may, if desired, be of adjustable length, are derived from any known form of pulses generator 45 which is synchronised in known manner by the pulses produced on lead 10, are applied to the third grid 43 so that the beginnings of the positive pulses applied to grid 41 coincide with the beginnings of the negative pulses applied to the grid 43. The pentode 42 is a short base pentode which is held cut off so long as a negative pulse is on the grid 43. So long as the positive pulses at the control grid 41 are no longer than the negative pulses on the grid 43 the valve 42 will remain cut off but if the former pulses exceed the latter in length the valve 42 becomes conductive and negative going pulses of length dependent upon the excess length appear at the anode. These pulses are utilized to control the blower motor in any of the ways already described and preferably as shown in Fig. 2 or Fig. 3 in which cases the circuitry to the right of the point Z in Fig. 4 will be the same as that shown to the right of the same point in Fig. 2 or Fig. 3 respectively.

Although in many cases control of the cooling by switching a blower motor on and off will be found most convenient, it will be obvious that the control may be exercised in other ways for example by controlling the opening and closing of a cooling air valve.

While I have described my invention in certain preferred embodiments, I realize that modifications may be made and I desire that it be understood that no limitations upon my invention are intended other than may be imposed by the scope of the appended claims.

I claim:
1. In combination a gas filled grid controlled electron discharge device exhibiting the phenomenon that the continuation of grid flow therein after switching on is dependent on the temperature thereof; a cooling system therefor; and means controlled in dependence on the mean grid current flow for controlling said cooling.

2. A gas filled grid controlled electron discharge device as set forth in claim 1 including at least a mercury cathode electron discharge device, a control grid and an anode.

3. A gas filled grid controlled electron discharge device as set forth in claim 1 wherein the control of the cooling system is controlled by a relay device having an operating coil connected in circuit with the control grid of the discharge device.

4. A gas filled grid controlled electron discharge device as set forth in claim 1 wherein recurrent pulses of grid current of the discharge device are rectified and integrated and the resultant employed to control the cooling system.

5. A gas filled grid controlled electron discharge device as set forth in claim 1 wherein recurrent pulses of grid current of the discharge device are rectified and integrated and the resultant employed to control the cooling system, and wherein said resultant is applied to actuate a switch-over circuit when said resultant passes a given value and said switch-over circuit is employed to control the cooling system.

6. A gas filled grid controlled electron discharge device as set forth in claim 1 wherein the discharge device is a periodically pulsed device and pulses of grid current flowing in the grid circuit of said device are compared with synchronously produced current pulses of predetermined length, the control of said cooling system being effected in dependence in differences upon length between the grid current pulses and the said produced pulses.

References Cited in the file of this patent

UNITED STATES PATENTS

| | | |
|---|---|---|
| 1,940,319 | Nolte | Dec. 19, 1933 |
| 2,089,896 | Journeaux | Aug. 10, 1937 |
| 2,171,930 | Gerecke | Sept. 5, 1939 |